(12) United States Patent
Li

(10) Patent No.: US 6,998,552 B1
(45) Date of Patent: Feb. 14, 2006

(54) FLOAT-TYPE LIQUID LEVEL SWITCH ASSEMBLY WITH LIGHT EMITTING ELEMENTS

(75) Inventor: Jui-Yang Li, Yung Kang (TW)

(73) Assignee: Young-G Enterprise Corporation, Tainan Hsien (TW)

( * ) Notice: Subject to any disclaimer, the term of this patent is extended or adjusted under 35 U.S.C. 154(b) by 0 days.

(21) Appl. No.: 11/189,730

(22) Filed: Jul. 27, 2005

(51) Int. Cl.
    *H01H 35/18* (2006.01)

(52) U.S. Cl. ............... 200/84 C; 200/310; 335/207; 73/319

(58) Field of Classification Search .......... 73/305–308, 73/313, 314, 317–319, 321, 322, 322.5; 116/110; 137/558; 200/84 R–84 C, 310; 335/205–207

See application file for complete search history.

(56) References Cited

U.S. PATENT DOCUMENTS

| | | | | |
|---|---|---|---|---|
| 3,545,272 A | * | 12/1970 | McGill | 73/311 |
| 3,982,087 A | * | 9/1976 | Bachman | 200/84 C |
| 4,730,491 A | * | 3/1988 | Lew | 200/84 C |
| 5,025,827 A | * | 6/1991 | Weng | 200/84 C |
| 5,829,303 A | * | 11/1998 | Fraser | 200/84 C |

\* cited by examiner

*Primary Examiner*—Michael A. Friedhofer
(74) *Attorney, Agent, or Firm*—Rosenberg, Klein & Lee

(57) ABSTRACT

A float-type liquid level switch includes a main body, a float, a magnetic reed switch, and a light emitting element; the float has a magnet joined thereto, and is displaceable along a length of the main body; the magnetic reed switch and the light emitting element are held in the main body; both the magnetic reed switch and the light emitting element are connected to a control circuit to form a circuit; when the float is moved to such a position by buoyancy of liquid in a container that the magnet is near to, and activates the magnetic reed switch, the light emitting element will be powered to produce light, which will travel out of the main body to indicate that liquid level reaches a certain point.

12 Claims, 9 Drawing Sheets

FLOAT-TYPE LIQUID LEVEL SWITCH ASSEMBLY WITH LIGHT EMITTING ELEMENTS

BACKGROUND OF THE INVENTION

1. Field of the Invention

The present invention relates to a float-type liquid level switch assembly, more particularly one, which is positioned in a container, and will start refilling action, and stop refilling action respectively when liquid level is low, and when liquid level is high, and which is equipped with light emitting elements so as to produce light when liquid level reaches certain points.

2. Brief Description of the Prior Art

Conventionally, water dispensers are equipped with float-type liquid level switches, which are electrically connected to control circuits of the water dispensers. Therefore, refilling and heating action will be started when liquid level is low. And, refilling action will be stopped when liquid level reaches the highest point.

A conventional float-type liquid level switch of a water dispenser includes two magnetic reed switches, and a float having a magnet secured thereto, and it is electrically connected to a control circuit; one of the magnetic reed switches is positioned as high as a high liquid level, and the other as high as a low liquid level. Thus, the magnet will be near to the lower magnetic reed switch, and the lower magnetic reed switch will be activated, and the control circuit will start refilling action when liquid level reaches the high point. And, the upper magnetic reed switch will be activated, and the control circuit will stop refilling action when liquid level reaches the high point.

However, the above water dispenser has to be further equipped with an indicating lamp circuit for showing which action the water dispenser is carrying out. Moreover, the indicating lamp circuit has relatively mini lamps. Consequently, people can't easily tell whether the lamps are on or not if they are a certain distance from the lamps.

SUMMARY OF THE INVENTION

It is a main object of the invention to provide an improvement on a liquid level switch to overcome the above-mentioned problem. The liquid level switch of the invention includes a main body, a float, a magnetic reed switch, and a light emitting element. The float has a magnet joined thereto, and is displaceable along a length of the main body. Both the magnetic reed switch and the light emitting element are held in the main body, and connected to a control circuit to form a circuit. Therefore, when the float is moved to such a position by buoyancy of liquid in a container that the magnet is near to, and activates the magnetic reed switch, the light emitting element will produce light, which will travel out of the main body to indicate that liquid level reaches a certain point.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
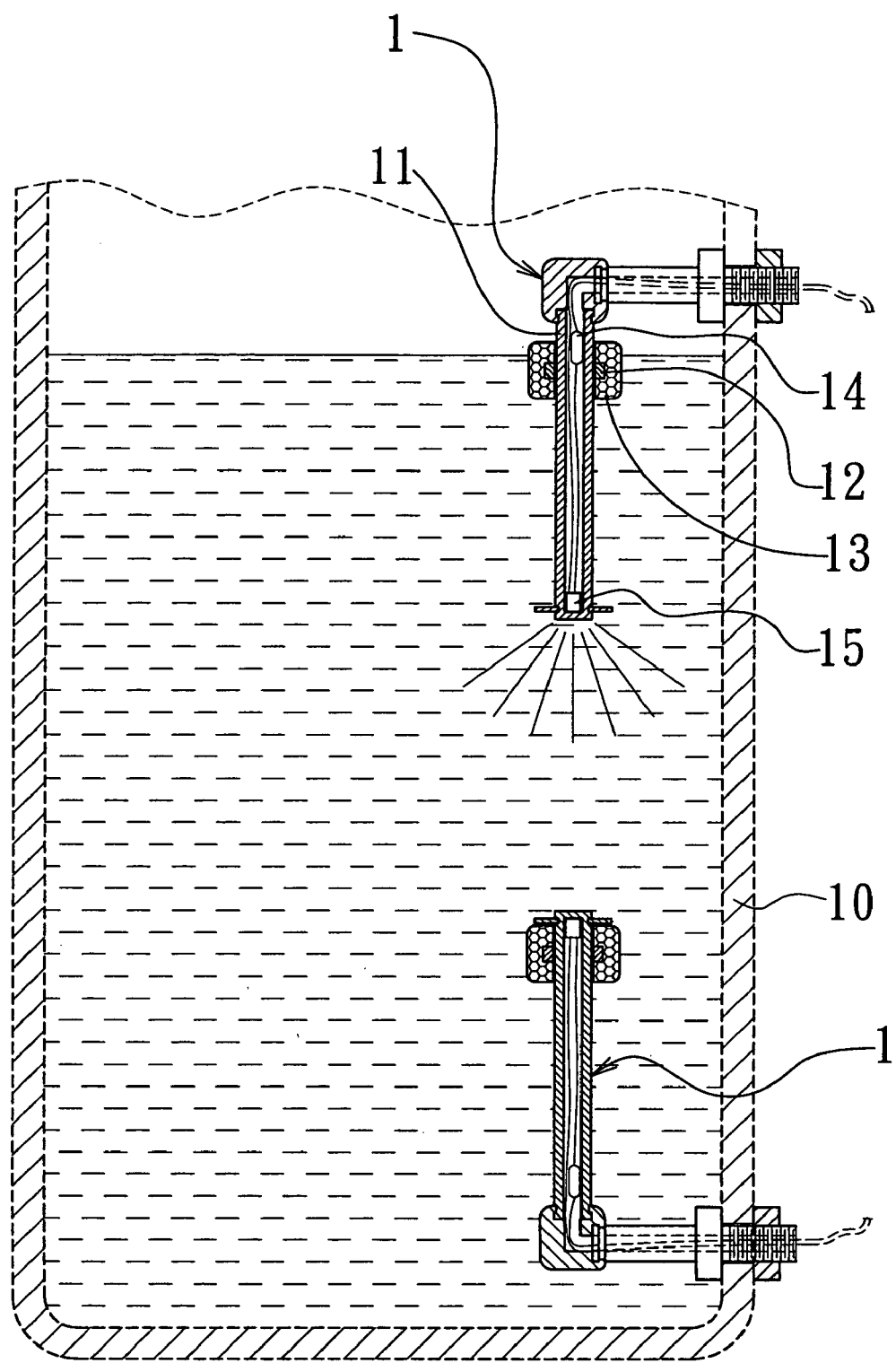
FIG. 1 is a view of the first preferred embodiment of a float-type liquid level switch in the invention, when the container is full.

Referring to FIG. 1, a first preferred embodiment of a float-type liquid level switch assembly includes two liquid level switches 1, which are positioned inside a container 10, and respectively joined to an upper end and a lower end of the container 10. Each of the liquid level switches 1 includes a main body 11, and a float 13 having a magnet 12 secured thereto; the main body 11 is made of a material pervious to light, and can guide light; the float 13 is positioned around, and displaceable along the length of the main body 11; the main body 11 contains both a magnetic reed switch 14 and a light emitting element 15. The magnetic reed switches 14 and the light emitting elements 15 are electrically connected to a control circuit such that an electronic circuit is formed.

When liquid level in the container 10 drops to such a low point that the float 13 of a lower one of the liquid level switches 1 isn't subjected to buoyancy, the corresponding magnet 12 will be near to, and activate the magnetic reed switch 14 held in the lower main body 11, and the corresponding light emitting element 15 will be powered to produce light, which will travel out of the main body 11. And, the control circuit will make the container 10 refilled. When liquid level in the container 10 rises to a high point as shown in FIG. 1, the float 13 of an upper one of the liquid level switches 1 will be near to the corresponding magnetic reed switch 14; thus, the magnetic reed switch 14 is activated, but the lower magnetic reed switch 14 isn't. And, the upper light emitting element 15 starts producing light, which will travel out of the main body 11, and the control circuit stops the refilling action, and starts heating of water in the container 10.

Figure 2:
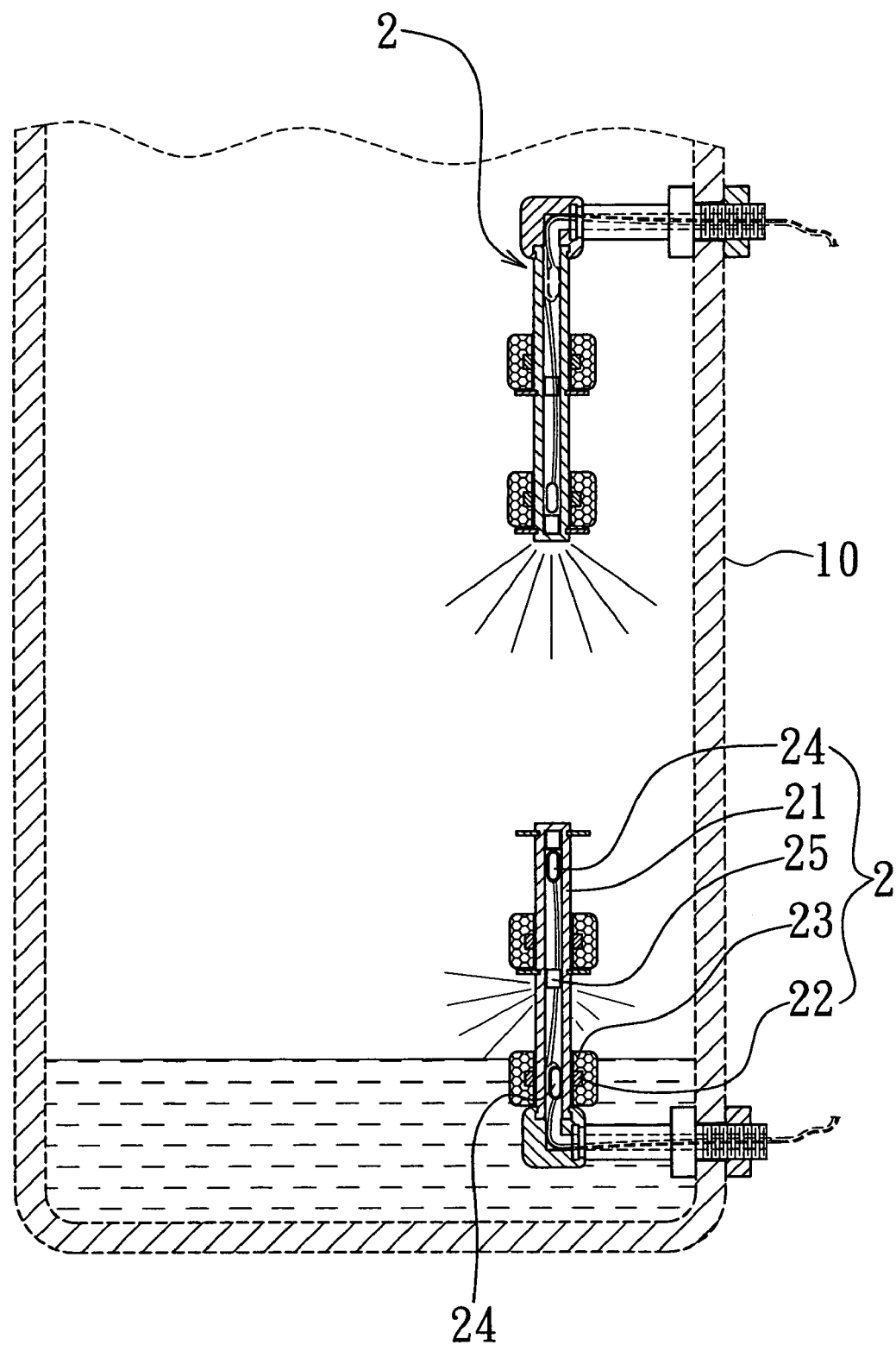
FIG. 2 is a view of the second preferred embodiment when the container needs to be refilled.
Figure 3:
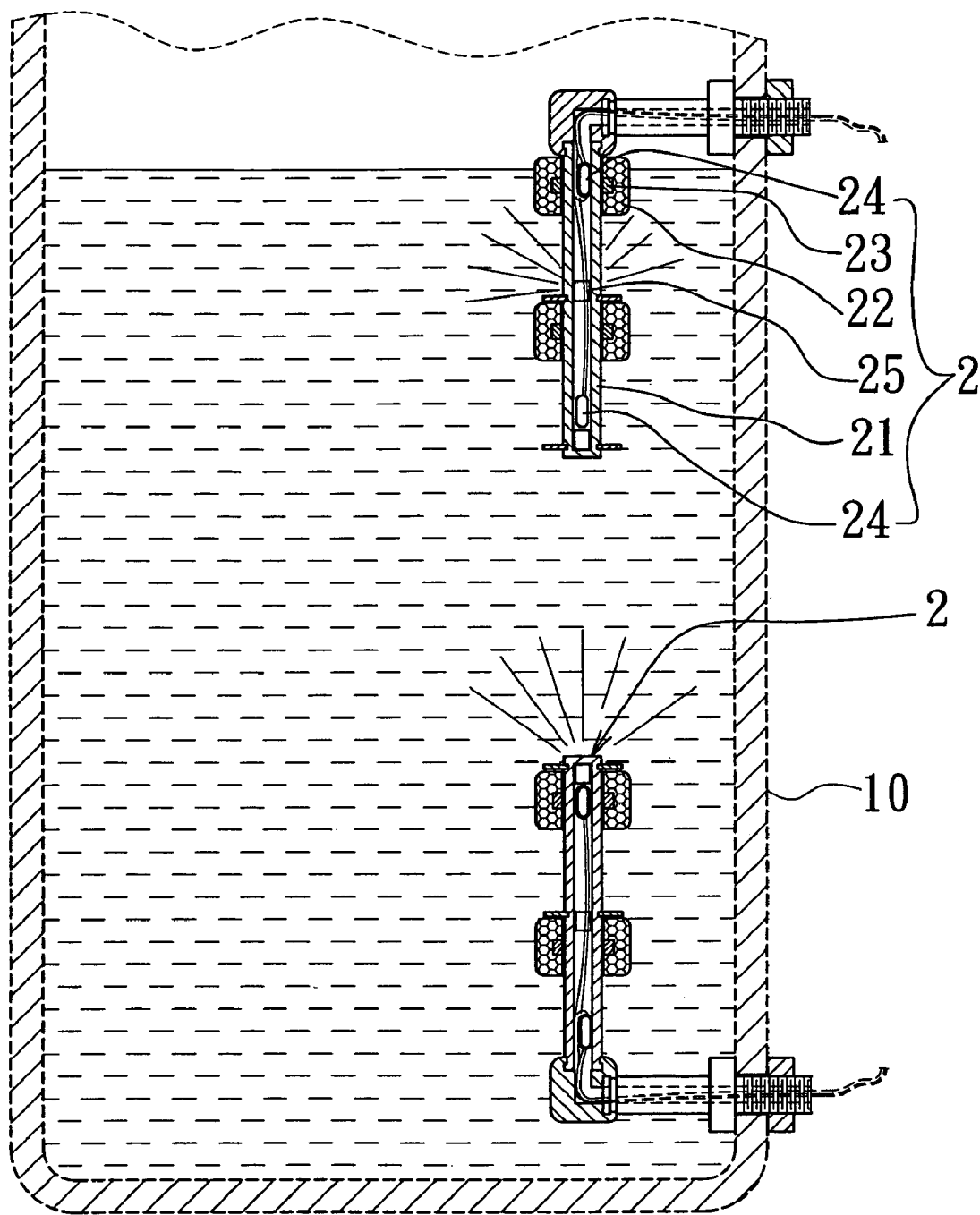
FIG. 3 is a view of the second preferred embodiment when the container is full.

Referring to FIGS. 2 and 3, a second preferred embodiment of a float-type liquid level switch assembly includes two liquid level switches 2, which are positioned inside a container 10, and respectively joined to an upper end and a lower end of the container 10. Each of the liquid level switches 2 includes a main body 21, and two floats 23, each of which has a magnet 22 secured therein; the main body 21 is divided into upper and lower sections while the floats 23 are respectively positioned around, and displaceable along the length of the upper and the lower sections of the main body 21; each of the upper and the lower sections of the main body 21 contains both a magnetic reed switch 24 and a light emitting element 25; both the magnetic reed switch 24 and the light emitting element 25 in a same section of the main body 21 are connected in series; the magnetic reed switch 24 and the light emitting element 25 in the upper section of the main body 21 are connected in parallel with those in the lower section of the main body 21. The magnetic reed switches 24 and the light emitting elements 25 are electrically connected to a control circuit such that an electronic circuit is formed. Therefore, the liquid level switch assembly can detect four different liquid levels in the container 10, which are full container level (highest point), high liquid level, low liquid level, and refilling level (lowest point) respectively.

Referring to FIG. 2, when liquid level in the container 10 drops to the lowest point, those of the floats 23 that are positioned around the lower sections of both the upper and the lower liquid level switches 2 won't be subjected to buoyancy, and the corresponding magnets 22 will be near to, and activate the magnetic reed switches 24 held in the lower sections of the upper and the lower liquid level switches 2, and the light emitting elements 25 held in the lower sections of the main bodies 21 will start shining. And, the control circuit will make the container 10 refilled. Referring FIG. 3, when liquid level in the container 10 rises to the highest point, all of the four floats 23 will be subjected to buoyancy, and the floats 23 around the lower sections of both the upper and the lower liquid level switches 2 will be apart from the corresponding magnetic reed switches 24, and the floats 23 around the upper sections of both the upper and the lower liquid level switches 2 will be near to, and activate the magnetic reed switches 24 held in the upper sections of the upper and the lower liquid level switches 2; thus, the corresponding light emitting elements 25, which are held in the upper sections of the main bodies 21, starts shining, and the control circuit stops the refilling action, and starts heating of water in the container 10.

Figure 4:
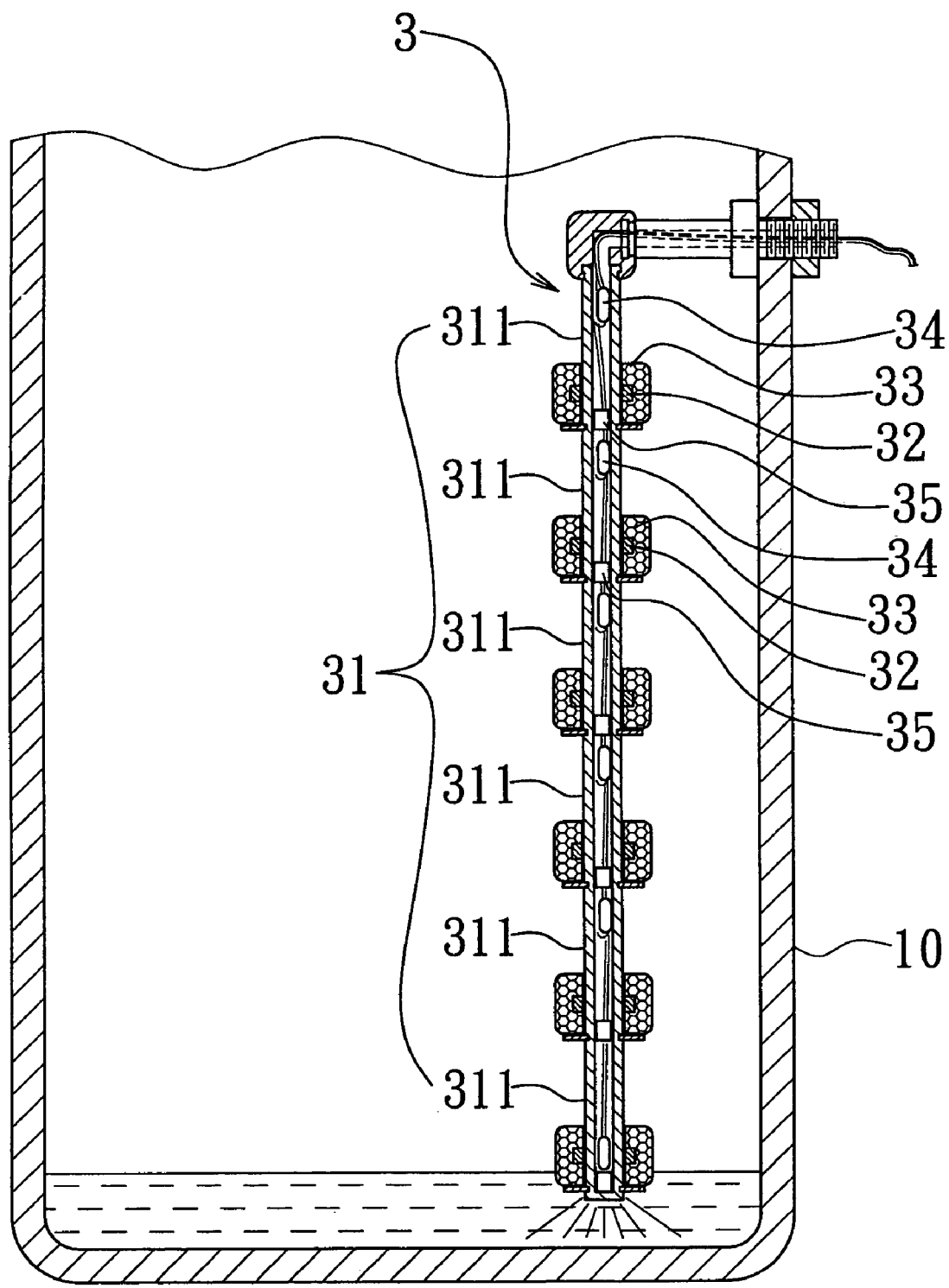
FIG. 4 is a view of the third preferred embodiment when the container needs to be refilled.
Figure 5:
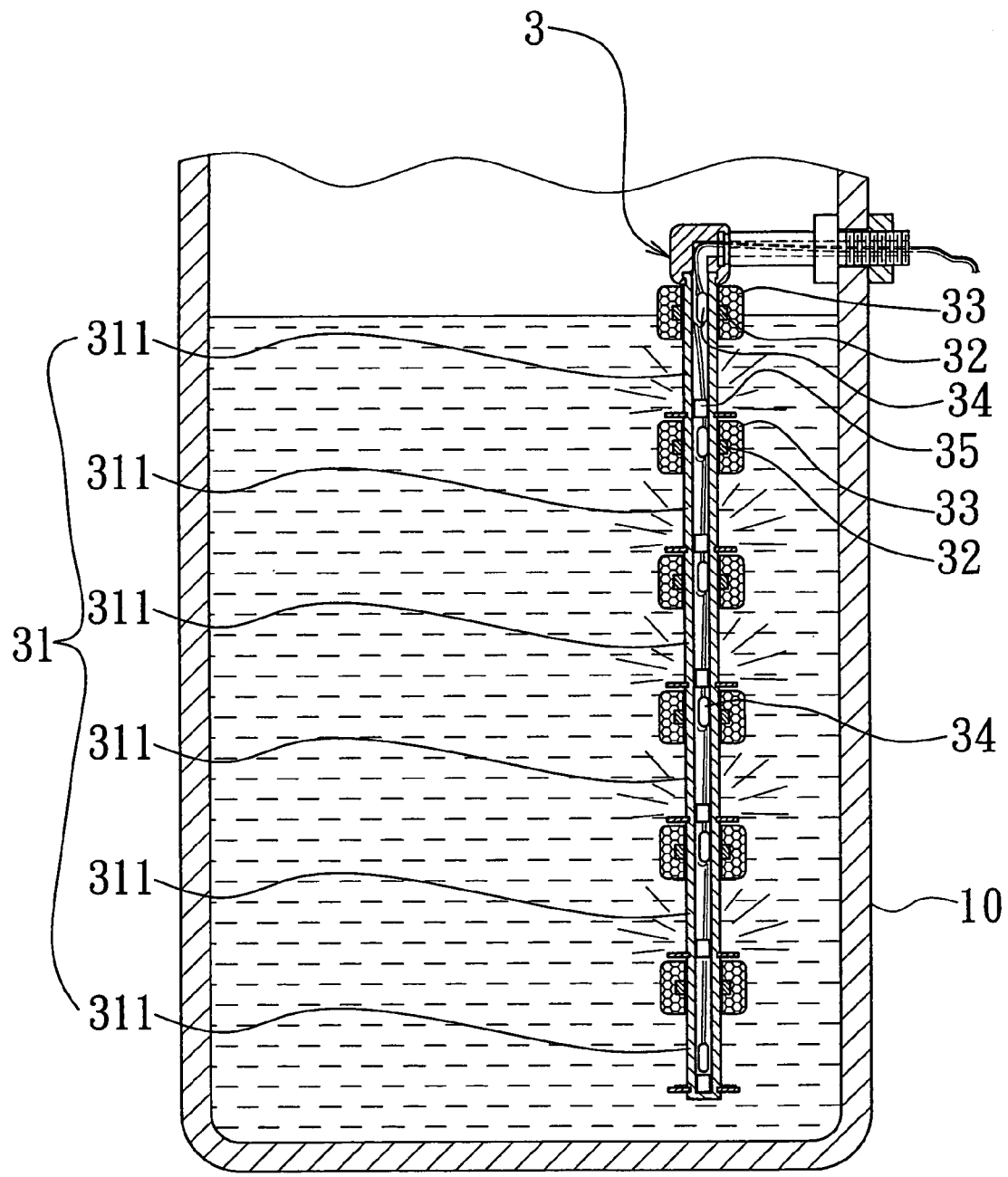
FIG. 5 is a view of the third embodiment when the container is full.

Referring to FIGS. 4 and 5, a third preferred embodiment of a float-type liquid level switch assembly 3 includes a main body 31, and several floats 33, each of which has a magnet 32 joined thereto. The main body 31 is divided into several sections 311 while the floats 33 are positioned around, and displaceable along the length of respective ones of the sections 311 of the main body 31. Each of the sections 311 of the main body 31 contains both a magnetic reed switch 34 and a light emitting element 35; both the magnetic reed switch 34 and the light emitting element 35 in a same section 311 of the main body 31 are connected in series; the magnetic reed switch 34 and the light emitting element 35 in the upper section of the main body 31 are connected in parallel with those held in the lower section of the main body 31. The magnetic reed switches 34 and the light emitting elements 35 are electrically connected to a control circuit such that an electronic circuit is formed.

Therefore, the liquid level switch assembly 3 can detect various liquid levels in the container 10, e.g. full liquid level as shown in FIG. 5, and low liquid level as shown in FIG. 4. And, those of the floats 33 that are risen to upper ends of the corresponding sections 311 by buoyancy will be near to the corresponding magnetic reed switches 34, and the magnetic reed switches 34 will be activated owing to the magnets 32; thus, the corresponding light emitting elements 35 start shining. And, the control circuit will start an appropriate action, e.g. water refilling, according to the present liquid level. Furthermore, the light emitting elements 35 are made in different colors for representing respective ones of the various actions, which are to be started by the control circuit.

Figure 6:
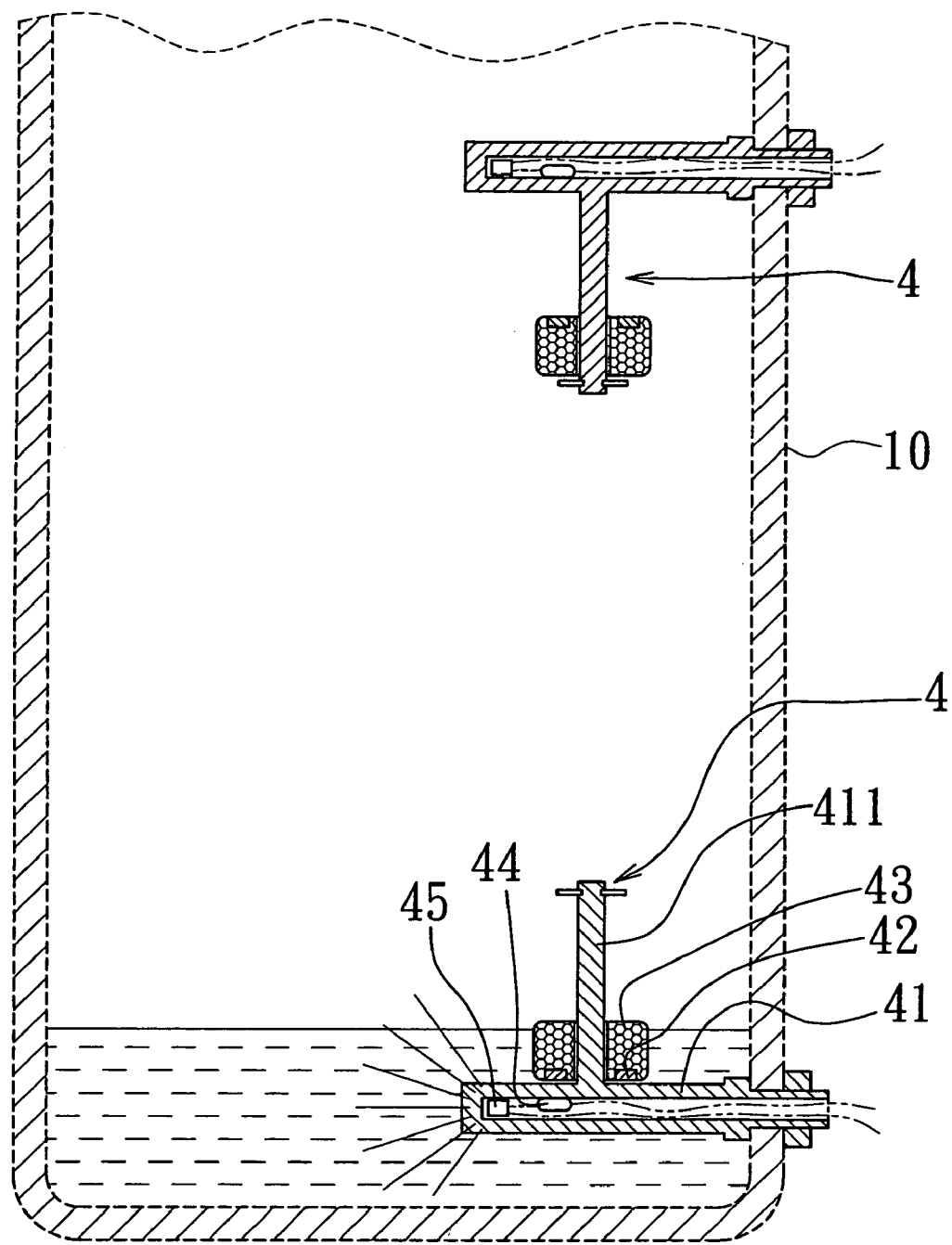
FIG. 6 is a view of the fourth preferred embodiment when the container needs to be refilled.
Figure 7:
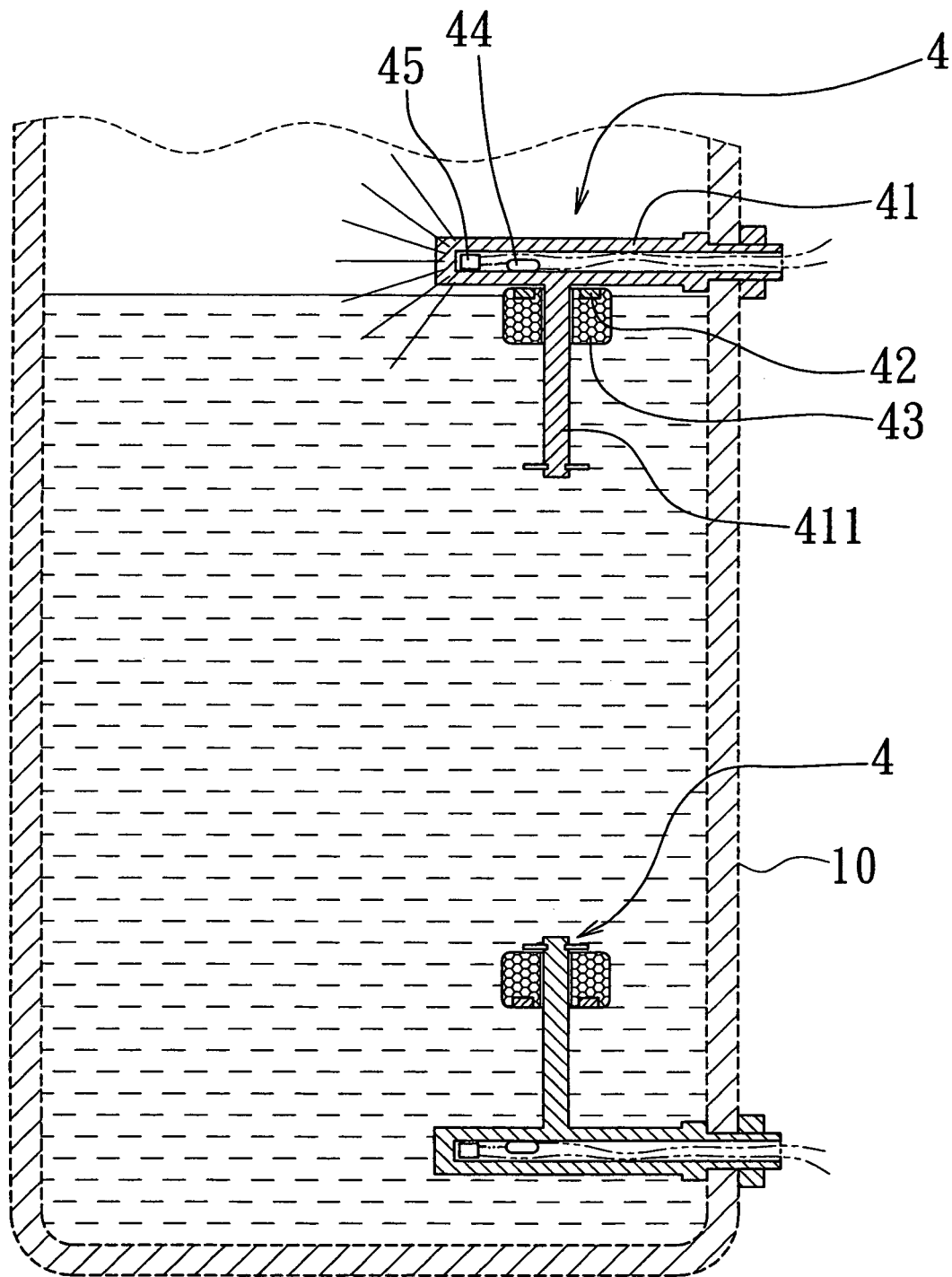
FIG. 7 is a view of the fourth preferred embodiment when the container is full.

Referring to FIGS. 6 and 7, a fourth preferred embodiment of a float-type liquid level switch assembly includes two liquid level switches 4, which are securely held in upper and lower portions of a containing room of a container 10. Each of the liquid level switches 4 includes a main body 41, and a float 43, each of which has a magnet 42 joined thereto; the main body 41 has a supporting post 411 projecting from it while the float 23 is positioned around, and displaceable along the length of the supporting post 411. Each of the main bodies 41 of the liquid level switches 4 contains both a magnetic reed switch 44 and a light emitting element 45, which are connected in series. The magnetic reed switches 44 and the light emitting elements 45 are electrically connected to a control circuit such that an electronic circuit is formed.

Therefore, when liquid level in the container 10 drops to the lowest point (refilling level) as shown in FIG. 6, the magnetic reed switch 44 in the main body 41 of the lower liquid level switch 4 will be activated; thus, the control circuit makes the container 10 refilled, and the corresponding light emitting element 45 starts shining. When liquid level in the container 10 rises to the highest point (full container level) as shown in FIG. 7, the magnetic reed switch 44 in the main body 41 of the upper liquid level switch 4 will be activated; thus, the control circuit stops the refilling action, and starts heating of water in the container 10, and the corresponding light emitting element 45 starts producing light, which will travel out of the upper one of the main bodies 41.

Figure 8:
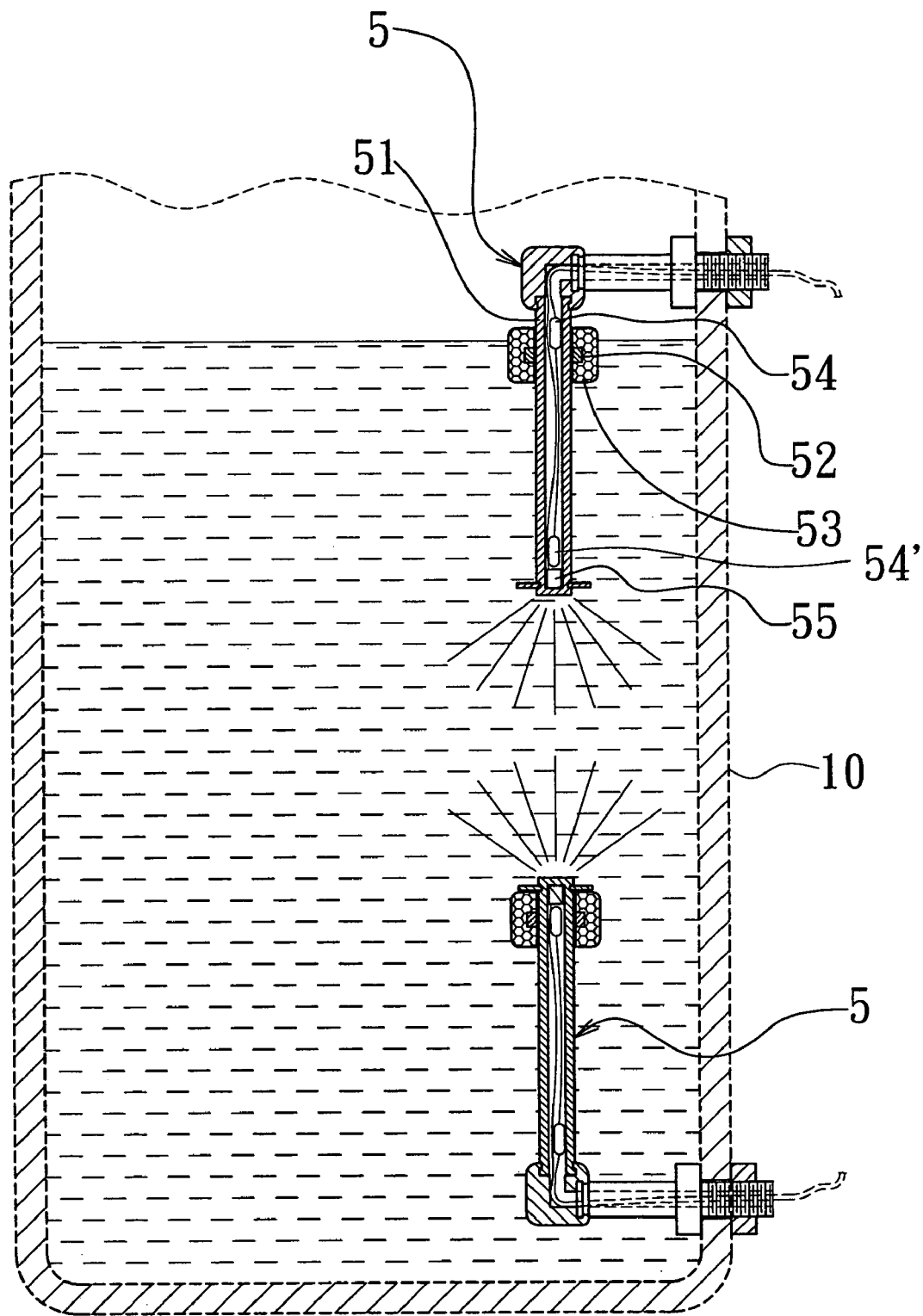
FIG. 8 is a view of the fifth preferred embodiment when the container is full.

Referring to FIG. 8, a fifth preferred embodiment of a float-type liquid level switch assembly includes two liquid level switches 5, which are secured in a container 10. Each of the liquid level switches 5 includes a main body 51, and a float 53 having a magnet 52 secured thereto; the float 53 is positioned around, and displaceable along the length of the main body 51; the main body 51 contains both two magnetic reed switches 54, 54' and a light emitting element 55; the magnetic reed switches 54 and 54' are connected in parallel while the light emitting element 55 is connected in series with the magnetic reed switches 54 and 54'. The magnetic reed switches 54, 54' and the light emitting elements 55 are electrically connected to a control circuit such that an electronic circuit is formed.

Therefore, when liquid level in the container 10 rises to a high point, water refilling action will be stopped even if one of the magnetic reed switches 54, 54' of the upper liquid level switch 5 is damaged. And, when liquid level in the container 10 drops to a low point, water refilling and heating action will be started even if one of the magnetic reed switches 54, 54' of the lower liquid level switch 5 is damaged. In other words, double protection is provided, and refilling action will be certainly started and stopped if necessary. And, people can easily tell the present liquid level by light produced by the light emitting elements 55.

Figure 9:
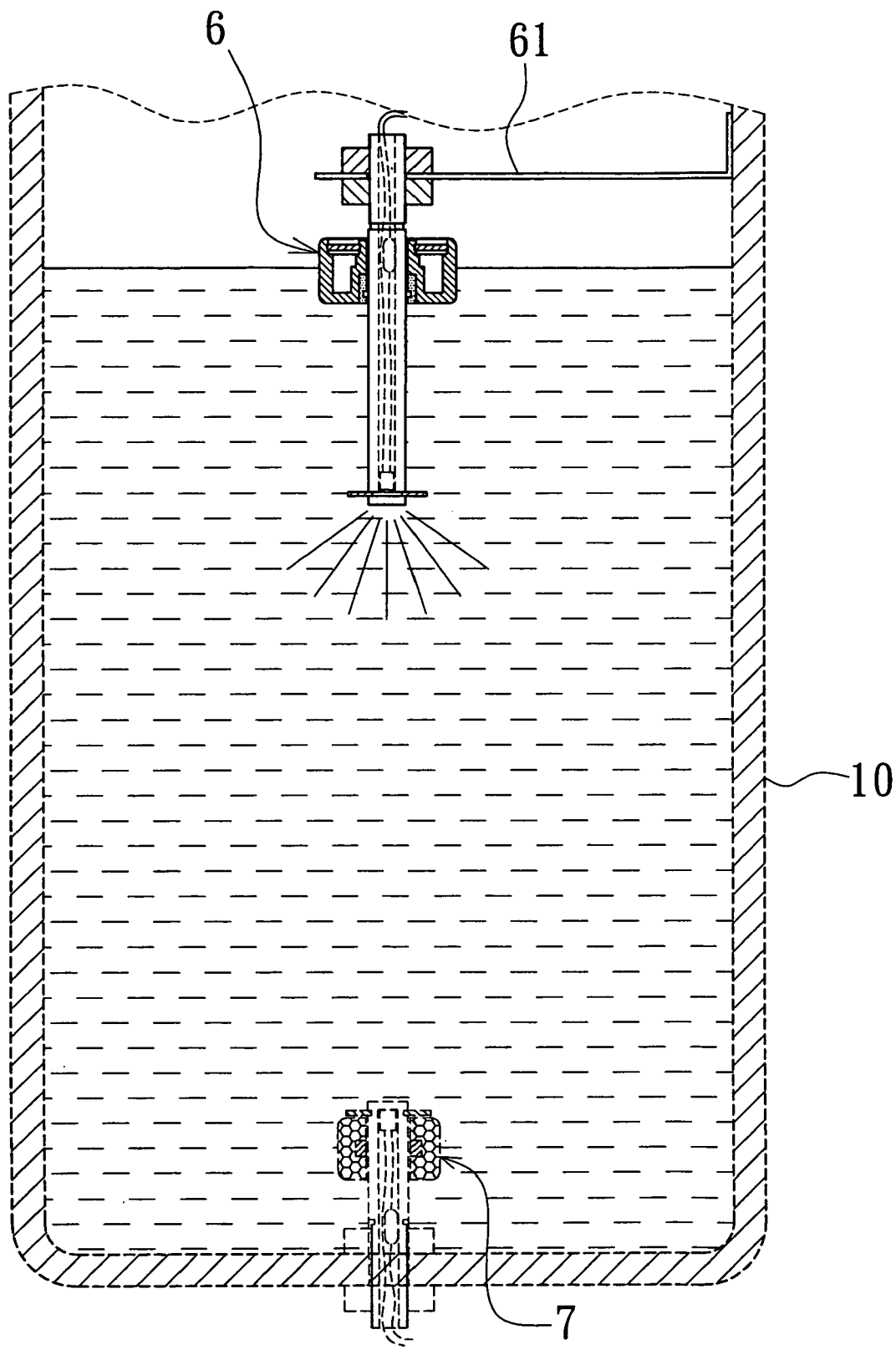
FIG. 9 is a view of the sixth embodiment as the container is full.

The above preferred embodiments of liquid level switch assembly 1, 2, 3, and 4 are secured on lateral wall portions of the containers 10. Referring to FIG. 9, a sixth preferred embodiment of a float-type liquid level switch assembly is secured in a different way; an upper liquid level switch 6 of the liquid level switch assembly is joined to a fixing board 61, which is secured to a lateral inner side of a container 10, such that the upper liquid level switch 6 is in a middle portion of the container 10; a lower liquid level switch 7 of the liquid level switch assembly is secured on a middle of a bottom portion of the container 10.

From the above description, it can be seen that the liquid level switch assemblies of the present invention has the following advantages: When a container is full, the liquid level switch assemblies can detect the water level, and in turns the control circuits stop the refilling action. When liquid level in a container is low, they can detect the water level, and in turns the control circuits start the refilling action. And, the liquid level switch assemblies will produce light, of which the color depends on the present liquid level, and in turns people can easily tell the present liquid level by the color of the light produced by the present invention.

What is claimed is:

1. A float-type liquid level switch assembly with light emitting elements, comprising
   a liquid level switch; the liquid level switch including:
   (a) a main body;
   (b) a float having a magnet joined thereto; the float being displaceable along a length of the main body;
   (c) a magnetic reed switch held in the main body; and
   (d) a light emitting element held in the main body; both the magnetic reed switch and the light emitting element being connected to a control circuit to form a circuit;
   whereby when the float is moved to such a position by buoyancy of liquid that the magnet is near to, and activates the magnetic reed switch, the light emitting element will be powered to produce light, which will travel out of the main body.

2. The float-type liquid level switch assembly with light emitting elements as claimed in claim 1, wherein the main body is made of a material pervious to light, and can guide light.

3. The float-type liquid level switch assembly with light emitting elements as claimed in claim 1, wherein the main body is divided into upper and lower sections, each of which contains both a magnetic reed switch and a light emitting element therein, and has a float, to which a magnet is joined, displaceable along a length thereof.

4. The float-type liquid level switch assembly with light emitting elements as claimed in claim 3, wherein the magnetic reed switch and the light emitting element held in the upper section of the main body and those in the lower section of the main body are connected in parallel.

5. The float-type liquid level switch assembly with light emitting elements as claimed in claim 1, wherein the main body is divided into a plurality of sections, each of which contains both a magnetic reed switch and a light emitting element therein, and has a float, to which a magnet is joined, displaceable along a length thereof.

6. The float-type liquid level switch assembly with light emitting elements as claimed in claim 5, wherein the magnetic reed switch and the light emitting element held in each of the sections of the main body are connected in parallel with those held in other ones of the sections of the main body.

7. The float-type liquid level switch assembly with light emitting elements as claimed in claim 1, wherein the main body contains a light emitting element and two magnetic reed switches therein instead.

8. The float-type liquid level switch assembly with light emitting elements as claimed in claim 7, wherein the magnetic reed switches are connected in parallel before they are connected to the light emitting element.

9. The float-type liquid level switch assembly with light emitting elements as claimed in claim 1, wherein the main body has a supporting post projecting from it, and the float is displaceable along a length of the supporting post instead.

10. The float-type liquid level switch assembly with light emitting elements as claimed in claim 1 being secured to a lateral wall portion of a container.

11. The float-type liquid level switch assembly with light emitting elements as claimed in claim 1 including upper and lower liquid level switches, which are secured to upper and lower ends of a container respectively.

12. The float-type liquid level switch assembly with light emitting elements as claimed in claim 11, wherein the upper liquid level switch is joined to a fixing board, and the lower liquid level switch is secured on a middle of a bottom portion of the container; the fixing board being secured to an inner side of a container such that the upper liquid level switch is in a middle portion of the container.

* * * * *